(12) United States Patent
Yamauchi et al.

(10) Patent No.: US 11,215,281 B2
(45) Date of Patent: Jan. 4, 2022

(54) CONTROL DEVICE FOR VEHICLE (71) Applicant: TOYOTA JIDOSHA KABUSHIKI KAISHA, Toyota (JP)

(72) Inventors: Yusuke Yamauchi, Obu (JP); Koki Ueno, Toyota (JP); Yusuke Nakade, Nagoya (JP); Ichiro Kitaori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/833,846

(22) Filed: Mar. 30, 2020

(65) Prior Publication Data

US 2020/0309254 A1 Oct. 1, 2020

(30) Foreign Application Priority Data

Apr. 1, 2019 (JP) .............................. JP2019-070252

(51) Int. Cl.
*F16H 61/18* (2006.01)
*F16H 61/12* (2010.01)
*F16H 61/32* (2006.01)
*F16H 59/10* (2006.01)
*F16H 59/02* (2006.01)

(52) U.S. Cl.
CPC ............. *F16H 61/12* (2013.01); *F16H 61/18* (2013.01); *F16H 61/32* (2013.01); *F16H 59/0217* (2013.01); *F16H 59/10* (2013.01); *F16H 2061/1224* (2013.01);

(Continued)

(58) Field of Classification Search
CPC .......... F16H 61/12; F16H 61/18; F16H 61/32; F16H 2061/326; F16H 2061/1224; F16H 2061/1292
See application file for complete search history.

(56) References Cited

U.S. PATENT DOCUMENTS 3,650,161 A * 3/1972 Ito ........................ F16H 61/0206
477/131
5,979,258 A * 11/1999 Nakano ................... F16H 61/18
74/335

(Continued)

FOREIGN PATENT DOCUMENTS

CN 102537331 A 7/2012
CN 103968060 A 8/2014
(Continued)

*Primary Examiner* — Edwin A Young
(74) *Attorney, Agent, or Firm* — Oblon, McClelland, Maier & Neustadt, L.L.P.

(57) ABSTRACT

A control device for a vehicle including (i) a power transmission device, (ii) a shift operation device that is to be operated by a driver of the vehicle to an operation position corresponding to a shift position of the power transmission device, and (iii) a switching device for switching the shift position of the power transmission device through actuation of an actuator. The control device is configured, upon occurrence of a momentary interruption of a control-device electric-power source that is supplied with an electric power from a vehicle electric-power source, to not perform an initial position learning process for setting a reference position of the actuator, until a shift switching operation for switching the shift position of the power transmission device is performed by a driver of the vehicle.

5 Claims, 7 Drawing Sheets

(52) U.S. Cl.
CPC ........... *F16H 2061/1268* (2013.01); *F16H 2061/1292* (2013.01); *F16H 2061/326* (2013.01)

(56) References Cited

U.S. PATENT DOCUMENTS

| | | | |
|---|---|---|---|
| 8,930,100 B2 * | 1/2015 | Minase | B60W 30/18027 701/54 |
| 2006/0276300 A1 | 12/2006 | Kashiwagi et al. | |
| 2012/0123653 A1 | 5/2012 | Kimura et al. | |
| 2014/0210395 A1 | 7/2014 | Nagata et al. | |
| 2015/0142283 A1 * | 5/2015 | Ono | F16H 61/32 701/60 |
| 2019/0203829 A1 | 7/2019 | Sakaguchi et al. | |

FOREIGN PATENT DOCUMENTS

| | | |
|---|---|---|
| JP | 2006-336840 A | 12/2006 |
| JP | 2011-231841 A | 11/2011 |
| JP | 2012-107655 A | 6/2012 |
| JP | 2012-107656 A | 6/2012 |
| JP | 2015-096741 A | 5/2015 |
| JP | 2018-48662 A | 3/2018 |

* cited by examiner

CONTROL DEVICE FOR VEHICLE

This application claims priority from Japanese Patent Application No. 2019-070252 filed on Apr. 1, 2019, the disclosure of which is herein incorporated by reference in its entirety.

FIELD OF THE INVENTION

The present invention relates to a control device for a vehicle, which is for switching a shift position of a power transmission device based on a control command signal corresponding to an operation position of a shift operation device.

DESCRIPTION OF THE RELATED ART

There is well known a control device for a vehicle including (i) a power transmission device configured to transmit a power of a drive power source to drive wheels of the vehicle, (ii) a shift operation device that is to be operated by a driver of the vehicle to an operation position corresponding to a shift position of the power transmission device, and (iii) a switching device configured to switch the shift position of the power transmission device through actuation of an actuator based on a control command signal corresponding to the operation position. For example, this corresponds to a shift-by-wire system described in Patent Document 1. It is disclosed in Patent Document 1 that, when a vehicle electric-power source is turned on due to a momentary interruption of the vehicle electric-power source, an actual shift position of an automatic transmission stored at the time of turning-off of the vehicle electric-power source is set as a target shift position to learn a reference position of an actuator corresponding to the target shift position.

PRIOR ART DOCUMENT

Patent Document

Patent Document 1: Japanese Laid-Open Patent Publication No. 2012-107656

SUMMARY OF THE INVENTION

A control-device electric-power source supplied with electric power from a vehicle electric-power source may momentarily be interrupted. When the control-device electric-power source is momentarily interrupted, if a shift position different from the actual shift position is stored before the momentary interruption of the control-device electric-power source, a reference position of an actuator corresponding to a shift position different from the actual shift position is set in an on state after the momentary interruption of the control-device electric-power source. This may cause switching to a shift position unintended by a driver of the vehicle.

The present invention was conceived in view of the situations and it is therefore an object of the present invention to provide a control device for a vehicle, which is capable of avoiding switching to a shift position unintended by a driver of the vehicle when a control-device electric-power source is momentarily interrupted. This object is achieved according to the following aspects of the present invention.

According to a first aspect of the invention, there is provided a control device for a vehicle including (i) a power transmission device configured to transmit a power of a drive power source to drive wheels of the vehicle, (ii) a shift operation device that is to be operated by a driver of the vehicle to an operation position corresponding to a shift position of the power transmission device, and (iii) a switching device configured to switch the shift position of the power transmission device through actuation of an actuator based on a control command signal corresponding to the operation position. The control device comprises a shift-switching control portion configured, when a vehicle electric-power source is switched from an off state to an on state by an operation of the driver, to perform, as an initial operation of the actuator, an initial position learning process for setting a reference position of the actuator, which serves as a basis for controlling the actuator. Upon occurrence of a momentary interruption of a control-device electric-power source that is supplied with an electric power from the vehicle electric-power source, namely, upon the occurrence of the momentary interruption in which the control-device electric-power source is temporarily brought into an off state and then returned to an on state, the shift-switching control portion is configured to not perform the initial position learning process, until a shift switching operation for switching the shift position of the power transmission device is performed by the driver.

According to a second aspect of the invention, in the control device according to the first aspect of the invention, the power transmission device includes a rotating member that is to be rotated together with the drive wheels, Upon the occurrence of the momentary interruption of the control-device electric-power source, the shift-switching control portion is configured to perform a first initial position learning process for setting a first reference position of the actuator corresponding to a parking position in which the rotating member is non-rotatably mechanically fixed, when the driver performs a first shift switching operation for switching the shift position of the power transmission device to the parking position. Upon the occurrence of the momentary interruption of the control-device electric-power source, the shift-switching control portion is configured to perform a second initial position learning process for setting a second reference position of the actuator corresponding to a non-parking position in which the rotating member is released from being mechanically fixed, when the driver performs a second shift switching operation for switching the shift position of the power transmission device to the non-parking position.

According to a third aspect of the invention, in the control device according to the second aspect of the invention, upon the occurrence of the momentary interruption of the control-device electric-power source during running of the vehicle, the shift-switching control portion is configured to perform the second initial position learning process when the driver performs the second shift switching operation, and is configured to not perform the first initial position learning process even when the driver performs the first shift switching operation.

According to a fourth aspect of the invention, in the control device according to any one of the first through third aspects of the invention, upon the occurrence of the momentary interruption of the control-device electric-power source, the shift-switching control portion is configured to set the shift position of the power transmission device to a neutral position in which transmission of the power is interrupted in the power transmission device, such that the power transmission device is held in the neutral position until the shift switching operation is performed by the driver.

According to a fifth aspect of the invention, in the control device according to the first through fourth aspect of the invention, the shift-switching control portion is configured to acquire a count value corresponding to a movement amount of the actuator, and to control the actuator such that the count value matches a predefined target count value, wherein the shift-switching control portion is configured to perform the initial position learning process by setting the reference position based on the count value when the actuator is moved in a direction in which the movement of the actuator is restricted.

According to the first aspect of the invention, upon occurrence of the momentary interruption of the control-device electric-power source that is supplied with the electric power from the vehicle electric-power source, namely, upon the occurrence of the momentary interruption in which the control-device electric-power source is temporarily brought into an off state and is then returned to an on state, the shift-switching control portion is configured to not perform the initial position learning process until the shift switching operation for switching the shift position of the power transmission device is performed by the driver, so that it is possible to maintain the position of the actuator at the time of the occurrence of the momentary interruption of the control-device electric-power source. Therefore, when the momentary interruption of the control-device electric-power source has occurred, the switching to a shift position unintended by the driver can be avoided.

According to the second aspect of the invention, upon the occurrence of the momentary interruption of the control-device electric-power source, the shift-switching control portion is configured to perform the first initial position learning process for setting the first reference position of the actuator corresponding to the parking position, when the driver performs the first shift switching operation for switching the shift position of the power transmission device to the parking position, so that the shift position can be switched to the parking position intended by the driver. Further, upon the occurrence of the momentary interruption of the control-device electric-power source, the shift-switching control portion is configured to perform the second initial position learning process for setting the second reference position of the actuator corresponding to the non-parking position, when the driver performs the second shift switching operation for switching the shift position of the power transmission device to the non-parking position, so that the shift position can be switched to the non-parking position intended by the driver. This eliminates the need for storing the shift position of the power transmission device in preparation for the momentary interruption of the control-device electric-power source before the momentary interruption of the control-device electric-power source. Therefore, a storage area is no longer necessary for storing the shift position in the control device etc., so that the cost of the control device etc. can be reduced, and the restriction on the storage area can be relaxed.

According to the third aspect of the invention, when the momentary interruption of the control-device electric-power source has occurred during running of the vehicle, the first initial position learning process is disabled and only the second initial position learning process is enabled, and this control arrangement can prevent a phenomenon caused by an attempt to switch the shift position of the power transmission device to the parking position during the running. In this phenomenon, attempts are repeatedly made to non-rotatably mechanically fix the rotating member that is to be rotated together with the drive wheels.

According to the fourth aspect of the invention, upon the occurrence of the momentary interruption of the control-device electric-power source, the shift-switching control portion is configured to set the shift position of the power transmission device to the neutral position, such that the power transmission device is held in the neutral position until the shift switching operation is performed by the driver, so that the transmission of the power can be interrupted during waiting until the shift position intended by the driver is known.

According to the fifth aspect of the invention, the initial position learning process is performed by setting the reference position based on the count value when the actuator is moved in a direction in which the movement of the actuator is restricted, and therefore, the reference position can be properly set by the initial position learning process.

MODES FOR CARRYING OUT THE INVENTION

In an embodiment of the present invention, for example, the drive power source is an engine such as a gasoline engine or a diesel engine generating power from combustion of fuel. The vehicle may include a rotating machine etc. as the drive power source in addition to or instead of the engine.

For example, the power transmission device includes an automatic transmission. For example, the automatic transmission is an automatic transmission such as a known planetary gear type automatic transmission, a known belt type continuously variable transmission, a known synchronous meshing type parallel two-shaft automatic transmission, a known DCT (dual clutch transmission), or a known electric continuously variable transmission.

An example of the present invention will now be described in detail with reference to the drawings.

EXAMPLE 1

Figure 1:
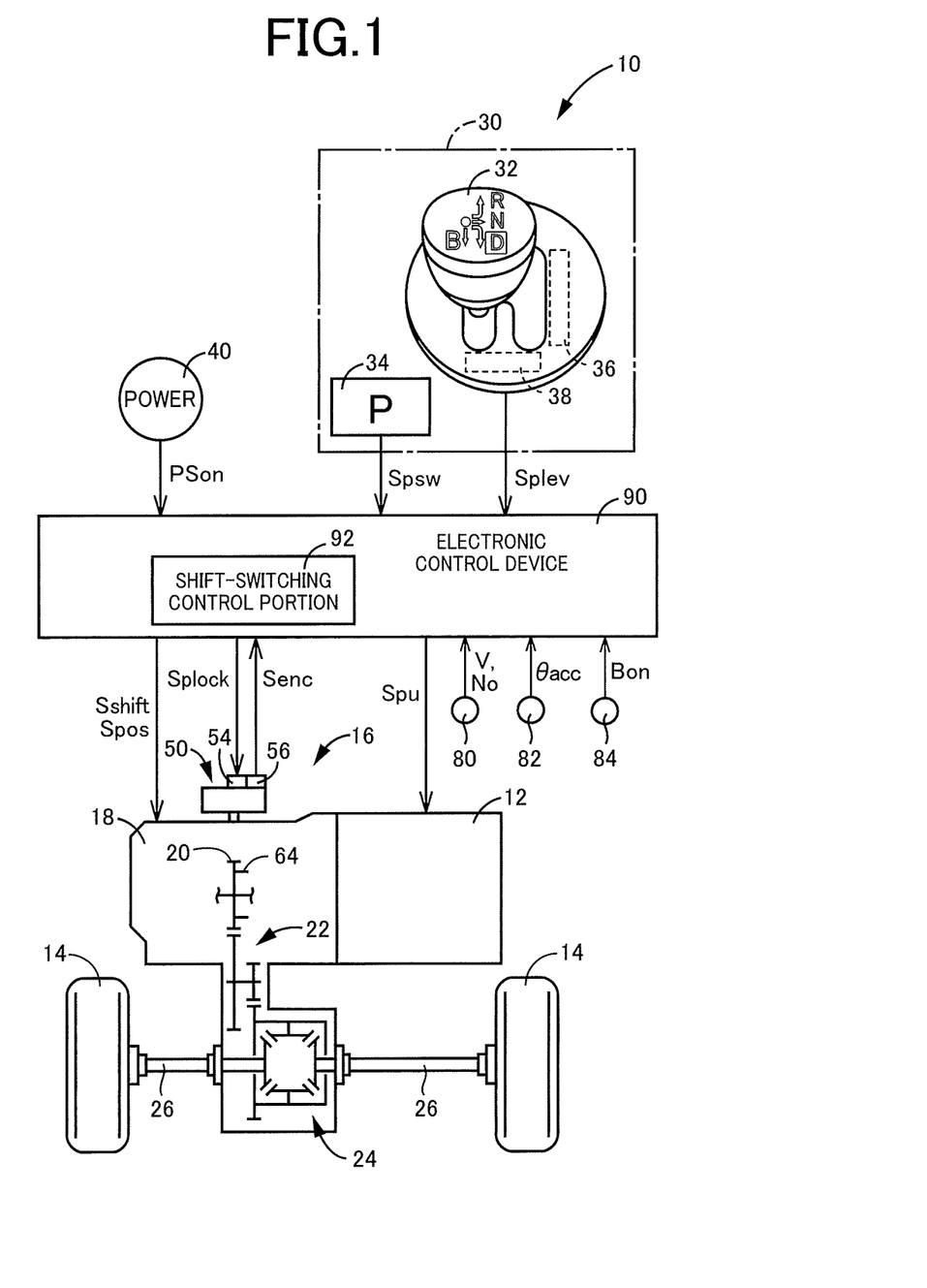
FIG. 1 is a diagram showing a schematic configuration of a vehicle to which the present invention is applied, for explaining main portions of control functions and control systems for various controls in the vehicle.

FIG. 1 is a diagram showing a schematic configuration of a vehicle 10 to which the present invention is applied. FIG.

1 is also a diagram for explaining main portions of control functions and control systems for various controls in the vehicle 10. In FIG. 1, the vehicle 10 includes a drive power source 12, drive wheels 14, and a power transmission device 16 for transmitting a power of the drive power source 12 to the drive wheels 14.

The power transmission device 16 includes an automatic transmission 18 coupled to the drive power source 12, a reduction gear mechanism 22 coupled to an output gear 20 that is an output rotating member of the automatic transmission 18, a differential gear 24 coupled to the reduction gear mechanism 22, and left and right drive shafts 26 coupled to the differential gear 24. In the power transmission device 16, the power output from the drive power source 12 is transmitted sequentially through the automatic transmission 18, the reduction gear mechanism 22, the differential gear 24, the drive shafts 26, etc. to the drive wheels 14. The output gear 20 is a rotating member that is to be rotated together with the drive wheels 14. The power has the same meaning as a torque and a force unless particularly distinguished.

The vehicle 10 further includes a shift operation device 30, a power switch 40, a switching device 50, etc. In the vehicle 10, the shift position of the automatic transmission 18 is switched by using a shift-by-wire system. In this example, shift-by-wire is also referred to as SBW. The shift position of the automatic transmission 18 has the same meaning as a shift range of the automatic transmission 18.

The shift operation device 30 is an operation device for permitting a person to select multiple kinds of shift positions in the automatic transmission 18, i.e., an operation device operated by a person to accept a request for switching the shift position of the automatic transmission 18. The shift operation device 50 is operated by a driver (=user) of the vehicle 10 to the operation position POSsh corresponding to the shift position of the automatic transmission 18. For example, the operation position POSsh includes P-, R-, N-, D-, and B-operation positions. The shift position of the automatic transmission 18 is the shift position of the power transmission device 16.

The P-operation position is a parking operation position for selecting a parking position (=P position) of the automatic transmission 18. The P position of the automatic transmission 18 is a shift position in which the automatic transmission 18 is brought into a neutral state and the output gear 20 is mechanically inhibited from being rotated. The neutral state of the automatic transmission 18 is a state in which transmission of a drive power in the power transmission device 16, i.e., power transmission in the automatic transmission 18, is interrupted, or in other words, a state in which the automatic transmission 18 cannot transmit the drive power. The state with the output gear 20 mechanically inhibited from being rotated is a state in which the output gear 20 is non-rotatably mechanically fixed and is a parking lock (=P-lock) state of the automatic transmission 18. The output gear 20 is non-rotatably mechanically fixed by the switching device 50.

The R-operation position is a reverse running operation position for selecting a reverse running position (=R position) of the automatic transmission 18. The R position of the automatic transmission 18 is a shift position in which the vehicle 10 can run backward. The N-operation position is a neutral operation position for selecting a neutral position (=N position) of the automatic transmission 18. The N position of the automatic transmission 18 is a shift position in which the automatic transmission 18 is brought into the neutral state. The D position of the automatic transmission 18 is a shift position in which the vehicle 10 can run forward. The B-operation position is a drive power source brake operation position for selecting a drive power source brake position (=B position) of the automatic transmission 18. The B position of the automatic transmission 18 is a shift position in which the drive power source brake using the drive power source 12 can be obtained more strongly than the D position while the vehicle 10 can run forward.

The R, N, D, and B positions of the automatic transmission 18 are all shift positions allowing the output gear 20 to be rotated, and are non-parking positions (=non-P positions) of the automatic transmission 18. The R, N, D, and B-operation positions are all non-parking operation positions (=non-P operation positions) for selecting the non-P positions of the automatic transmission 18. The state of allowing the output gear 20 to be rotated is a state in which the output gear 20 is released from being mechanically released, i.e., a state in which the P-lock state of the automatic transmission 18 is released, and is a non-parking lock (=non-P-lock) state of the automatic transmission 18.

The shift operation device 30 includes operation elements selectively operated by the driver to multiple operation positions POSsh corresponding to the multiple shift positions of the automatic transmission 18. For example, the operation elements are a shift lever 32 and a P switch 34. The P switch 34 is an operation element disposed separately from the shift lever 32. The operation positions POSsh of the shift lever 32 are lever positions Plev, and the operation position of the P switch 34 is a P-switch-on position Psw. Both the shift lever 32 and the P switch 34 are momentary type operation elements that are to be returned to original positions when no external force is applied.

To set the shift position of the automatic transmission 18 to a desired shift position that is one of multiple non-P positions other than the P position, the shift lever 32 is selectively operated by the driver to the lever position Plev corresponding to the desired shift position. The P switch 34 is operated by the driver to set the shift position of the automatic transmission 18 to the P position.

The lever positions Plev of the shift lever 32 are an R-operation position, an N-operation position, a D-operation position, an H-operation position, and a B-operation position. The H-operation position is a home position that is an original position of the shift lever 32. Even if the shift lever 32 is operated to the lever position Plev other than the H-operation position, the shift lever 32 is returned to the H-operation position by a mechanical mechanism such as a spring when the driver releases the shift lever 32. The shift operation device 30 includes a shift sensor 36 and a select sensor 38 that are position sensors for detecting the lever position Plev. The shift sensor 36 and the select sensor 38 output a lever position signal Splev corresponding to the lever position Plev to an electronic control device 90 described later. The electronic control device 90 determines the lever position Plev based on the lever position signal Splev. As a result, an operation to the R-, N-, D-, or B-operation position is detected.

For example, the P switch 34 is a momentary type push button switch and is subjected to a pushing operation by the driver to a P-operation position that is the P-switch-on position Psw. The P switch 34 is not subjected to the pushing operation in a home position that is an original position of the P switch 34. Even if the P switch 34 is subjected to the pushing operation to the P-operation position, the P switch 34 is returned to the original position by a mechanical mechanism such as a spring when the driver releases the P switch 34. Each time the P switch 34 is pushed to the P-operation position, the P switch 34 outputs a P-switch signal Spsw corresponding to the P-operation position to the electronic control device 90 described later. The electronic control device 90 detects the operation to the P-operation position based on the P-switch signal Spsw.

The operation to the P-operation position is a first shift operation for switching the shift position of the automatic transmission 18 to the P position and is also referred to as a P-switch operation. The operation to any of the R-, N-, and D-operation positions is a second shift switching operation for switching the shift position of the automatic transmission 18 to the non-P position and is also referred to as a non-P lever operation. The P-switch operation and the non-P lever operation are shift switching operations for switching the shift position of the automatic transmission 18.

The power switch 40 is a switch operated by the driver to switch an electric power source supply state of the vehicle 10, i.e., a state of a vehicle electric-power source. For example, the power switch 40 is a momentary type push button switch and is subjected to a pushing operation by the driver to a switch-on position. Each time the power switch 40 is subjected to the pushing operation to the switch-on position, the power switch 40 outputs a power switch signal PSon corresponding to the switch-on position to the electronic control device 90. The electronic control device 90 detects the driver's operation of the power switch 40 based on the power switch signal PSon. The driver's operation of the power switch 40 is a vehicle electric-power source operation for switching the state of the vehicle electric-power source. The state of the vehicle electric-power source is switched by the electronic control device 90 described later, depending on the power switch signal PSon, the operation position POSsh, a brake-on signal Bon described later, etc.

For example, the state of the vehicle electric-power source includes a state of off (="OFF") as an off state, a state of accessory-on (="ACC") as a partially on state, and a state of ignition-on (="IGON") as an on state. For example, the OFF state is a power source state for disabling vehicle running (i.e., running of the vehicle 10) and also disabling even a portion of functions not related to the vehicle running. For example, the ACC state is a power source state for turning off a combination meter (not shown) and disabling the vehicle running while enabling the portion of functions not related to the vehicle running. For example, the IGON state is a power source state for turning on the combination meter and enabling the vehicle running. In a broad sense, for example, the IG-ON state is a state in which the vehicle running can be controlled and includes a READY-ON state in which the vehicle 10 can start and run when an accelerator is turned on. In a narrow sense, the IG-ON state does not include the READY-ON state, is a state in which functions other than those controlling the vehicle running can be controlled, and is a state in which the drive power source 12 cannot be driven, i.e., the vehicle 10 cannot start or run even when the accelerator is turned on.

For example, when the vehicle electric-power source is OFF while the shift position of the automatic transmission 18 is the P position and the brake-on signal Bon is not input, the vehicle electric-power source is switched to OFF→ACC→IG-ON (not including READY-ON)→OFF→ . . . , each time the vehicle electric-power source operation is performed. For example, when the vehicle electric-power source is OFF, ACC, or IG-ON (not including READY-ON) while the shift position of the automatic transmission 18 is the P position and the brake-on signal Bon is input, the vehicle electric-power source is switched to READY-ON by the vehicle electric-power source operation. For example, when the vehicle is stopped and the vehicle electric-power source is READY-ON, the vehicle electric-power source is switched to OFF by the vehicle electric-power source operation.

Figure 2:
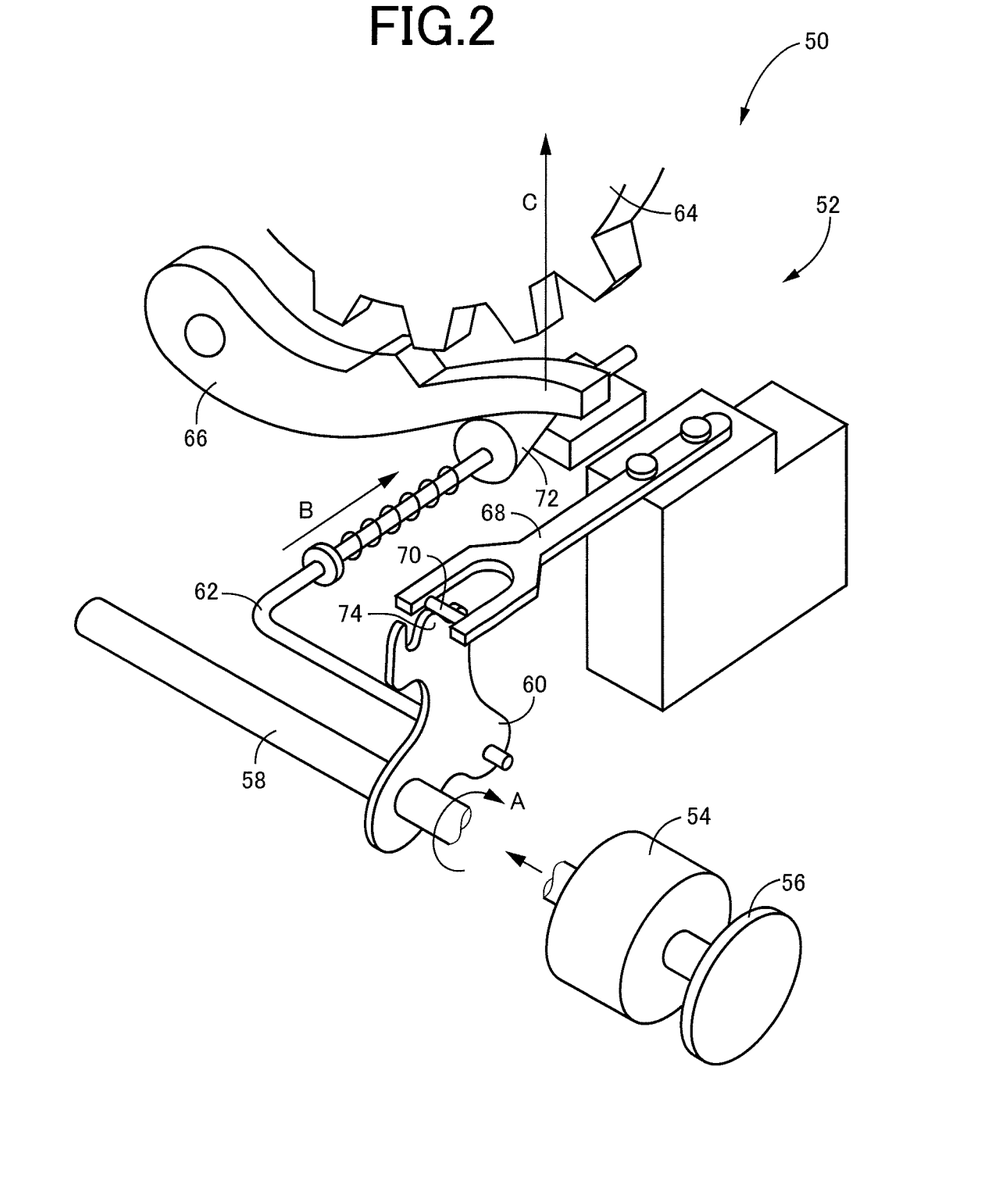
FIG. 2 is a perspective view showing an example of a switching device.

FIG. 2 is a perspective view for explaining a configuration of the switching device 50. In FIG. 2, the switching device 50 switches the shift position of the automatic transmission 18 through actuation of an actuator based on a control command signal corresponding to the operation position POSsh. The control command signal is a P-switching control command signal Splock from the electronic control device 90 described later, and the actuator is a motor 54 described later.

Specifically, the switching device 50 includes a P-lock mechanism 52, a motor 54, an encoder 56, etc. The switching device 50 is a P-lock device for non-rotatably mechanically fixing the output gear 20 of the automatic transmission 18 and switching the automatic transmission 18 between the P-lock state and the non-P-lock state.

For example, the motor 54 is a switched reluctance motor (=SR motor) and drives the P-lock mechanism 52 in response to the P-switching control command signal Splock from the electronic control device 90 described later. For example, the encoder 56 is a rotary encoder and rotates integrally with the motor 54 to supply to the control device 90 a pulse signal Senc for acquiring an encoder count Cenc that is a count value (=count) corresponding to a rotation amount of the motor 54. The rotation of the motor 54 has the same meaning as the movement of the motor 54, and the rotation amount of the motor 54 has the same meaning as the movement amount of the motor 54.

The P-lock mechanism 52 includes a shaft 58, a detent plate 60, a P rod 62, a P-lock gear 64, a P-lock pawl 66, a spring 68, a roller 70, a cam 72, etc. The shaft 58 is a member that is to be driven to be rotated by the motor 54. The detent plate 60 is coupled via the shaft 58 to a drive shaft of the motor 54 and is a member that is to be pivoted or rotated together with the shaft 58 by the motor 54. The P rod 62 is coupled to the detent plate 60 and is a member that is to be actuated with the rotation of the detent plate 60. The P-lock gear 64 is a member fixed concentrically with the output gear 20 of the automatic transmission 18, so as to be rotated integrally with the output gear 20 (see FIG. 1). The P-lock pawl 66 has a claw portion that is to mesh with gear teeth of the P-lock gear 64 and is a member capable of meshing with the P-lock gear 64. The spring 68 is a member for limiting the rotation of the detent plate 60. The roller 70 is a member disposed at a tip of the spring 68 on a side of the detent plate 60. The cam 72 is disposed at a tip of the P rod 62 on the P-lock pawl 66 side and is a tapered member that is be moved toward the P-lock pawl 66 to cause the P-lock pawl 66 to mesh with the P-lock gear 64.

Figure 3:
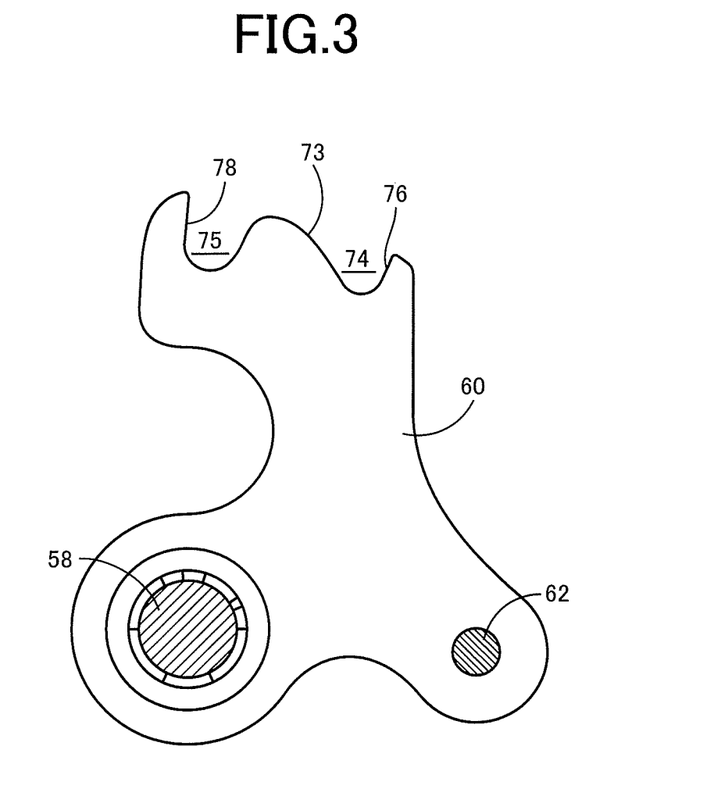
FIG. 3 is a diagram illustrating a configuration of a detent plate.

FIG. 3 is a diagram illustrating the configuration of the detent plate 60. In FIG. 3, the detent plate 60 is provided with a crest 73 in its top portion. In this example, in each of two troughs (recesses) 74, 75 sandwiching the crest 73, a surface located on a side away from the crest 73 is referred to as a wall. The wall of the trough 74 corresponding to the non-P position of the automatic transmission 18 is a non-P wall 76. The wall of the trough 75 corresponding to the P position of the automatic transmission 18 is a P wall 78. When the roller 70 moves from the trough 75 to the trough 74, the motor 54 is controlled by the electronic control device 90 described later such that the non-P wall 76 does not collide with the roller 70. Specifically, the electronic control device 90 stops the rotation of the motor 54 in a non-P target rotation position that is a position immediately before the non-P wall 76 collides with the roller 70. When the roller 70 moves from the trough 74 to the trough 75, the motor 54 is controlled by the electronic control device 90 such that the P wall 78 does not collide with the roller 70. Specifically, the electronic control device 90 stops the rotation of the motor 54 in a P target rotation position that is a position immediately before the P wall 78 collides with the roller 70. As described above, the detent plate 60 is a P-lock positioning member for switching the P-lock mechanism 52 between the P-lock position corresponding to the P position and the non-P-lock position corresponding to the non-P position.

Returning to FIG. 2, FIG. 2 shows a state in which the P-lock mechanism 52 is in the non-P-lock position. The state shown in FIG. 2 is a non-lock state after releasing a lock state in which the P-lock pawl 66 meshes with the P-lock gear 64, and therefore, the rotation of the output gear 20 is not blocked by the P-lock mechanism 52. When the shaft 58 is rotated in a direction of an arrow A by the motor 54 from the state shown in FIG. 2, the P rod 62 is pushed in a direction of an arrow B through the detent plate 60, and the P-lock pawl 66 is moved upward in a direction of an arrow C by the cam 72. When the detent plate 60 rotates until the roller 70 located in the trough 74 of the detent plate 60 climbs over the crest 73 and moves to the trough 75, the P-lock pawl 66 is pushed up to a position of meshing with the P-lock gear 64. As a result, the rotation of the output gear 20 is mechanically blocked together with the P-lock gear 64, the P-lock mechanism 52 is set to the P-lock position, and the shift position of the automatic transmission 18 is set to the P position.

Figure 4:
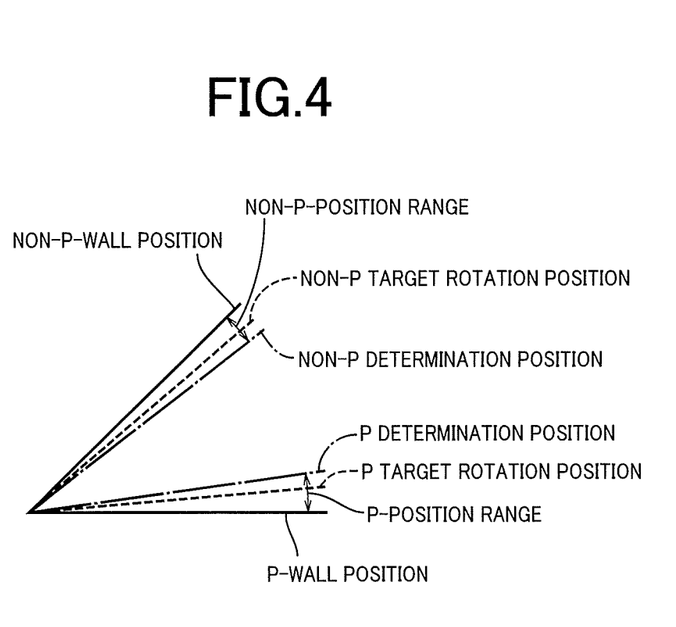
FIG. 4 is a diagram for explaining a correlation between a rotation amount of the detent plate and a shift position of an automatic transmission.

FIG. 4 is a diagram for explaining a correlation between the encoder count Cenc corresponding to the rotation amount of the motor 54 and the shift position of the automatic transmission 18. The motor 54 rotationally drives the detent plate 60, and a rotation position of the motor 54, i.e., a motor rotation position, is restricted by both the non-P wall 76 and the P wall 78. FIG. 4 conceptually shows a P-wall position that is a position of the P wall 78 and a non-P-wall position that is a position of the non-P wall 76, for rotation control of the motor 54. A P determination position and a non-P determination position shown in FIG. 4 are both predetermined positions of the detent plate 60 in which switching of the shift position of the automatic transmission 18 is determined. Therefore, a range from the P determination position to the P-wall position is a P-position range, and a range from the non-P determination position to the non-P-wall position is a non-P-position range. When the encoder count Cenc is in the P position range, it is determined that the shift position is the P position, and when the encoder count Cenc is in the non-P position range, it is determined that the shift position is in the non-P position. When the encoder count Cenc is located between the P determination position and the non-P determination position, it is determined that the shift position is indefinite, or the shift position is being switched. The determination described above is performed by the electronic control device 90 described later.

As shown in FIG. 4, a P target rotation position is set within the P-position range, and a non-P target rotation position is set within the non-P-position range. The P target rotation position is a position where the P wall 78 does not collide with the roller 70 at the time of switching from the non-P position to the P position and is defined with a predetermined margin from the P-wall position. Similarly, the non-P target rotation position is a position where the non-P wall 76 does not collide with the roller 70 at the time of switching from the P position to the non-P position and is defined with a predetermined margin from the non-P-wall position. The predetermined margin from the P-wall position and the predetermined margin from the non-P-wall position do not have to be necessarily the same and may differ depending on the shape of the detent plate 60 etc.

In the switching device 50 constructed as described above, the encoder count Cenc is acquired by the electronic control device 90 described later based on the pulse signal Senc output from the encoder 56, and the motor rotation position is determined. Since the encoder 56 is a relative position sensor, a reference position of the motor 54 is set, and the motor rotation position defined as an absolute position of the motor 54 is determined based on the encoder count Cenc from the reference position. For example, the electronic control device 90 detects the P-wall position and/or the non-P-wall position to set the reference position. The setting of the reference position will be described later.

Referring back to FIG. 1, the vehicle 10 further includes the electronic control device 90 as a controller including a control device of the vehicle 10. The electronic control device 90 is constructed to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 90 performs output control of the drive power source 12, shift control of the automatic transmission 18, switching control of the shift position of the automatic transmission 18 by the switching device 50, etc. Further, the electronic control device 90 may be constituted by two or more control units exclusively assigned to perform respective different controls such as the output control, the shift control and the SBW control.

The electronic control device 90 receives various input signals based on values detected by respective sensors provided in the vehicle 10. Specifically, the electronic control device 90 receives: an output signal of the P switch 34 which is the P-switch signal Spsw; an output signal of the shift sensor 36 and the select sensor 38 which is the lever position signal Splev; an output signal of the power switch 40 which is the power switch signal PSon; an output signal of the encoder 56 which is the pulse signal Senc; an output signal of an output rotation-speed sensor 80 indicative of an output rotation speed No which is a rotation speed of the output gear 20 and which corresponds to the vehicle speed V; an output signal of an accelerator opening sensor 82 indicative of an accelerator opening degree θacc which represents an amount of accelerating operation made by the driver; and an output signal of a brake switch 84 which is the brake-on signal Bon indicative of a state in which a brake pedal is operated by the driver.

The electronic control device 90 outputs to the devices included in the vehicle 10 (e.g., the drive power source 12, the automatic transmission 18, and the motor 54) various control command signals (e.g., a drive-power-source control command signal Spu for controlling the drive power source 12, a shift-control command signal Sshift for controlling the shift of the automatic transmission 18, a shift-position switching control command signal Spos for switching the shift position among the non-P positions of the automatic transmission 18, and the P-switching control command signal Splock for controlling the actuation of the switching device 50).

For executing the SBW control, the electronic control device 90 includes a shift-switching control means, i.e., a shift-switching control portion 92.

The shift-switching control portion 92 acquires the encoder count Cenc corresponding to the rotation amount of the motor 54 based on the pulse signal Senc. The shift-switching control portion 92 controls the motor 54 such that the encoder count Cenc matches a target encoder count Cenctgt. For example, the target encoder count Cenctgt is a predefined target count value for stopping the motor 54 in the P target rotation position or the non-P target rotation position. For the encoder count Cenc, for example, a value according to rotation in a direction toward the P-wall position (rotation in the direction of the arrow A of FIG. 2) is set to a negative value.

When the vehicle electric-power source is switched from OFF to IG-ON by a driver's vehicle electric-power source operation, the shift-switching control portion 92 performs an initial drive control of the motor 54 such as excitation matching, i.e., phase matching, of the motor 54 for appropriate control of the rotation of the motor 54. Subsequently, the shift-switching control portion 92 detects the P-wall position and the non-P-wall position of the motor 54, and sets the reference position of the motor 54.

Specifically, the shift-switching control portion 92 drives the motor 54 to rotate the detent plate 60 in a direction causing the P wall 78 to move toward the roller 70 of the spring 68 to bring the roller 70 into contact with the P wall 78. The direction causing the P wall 78 to move toward the roller 70 of the spring 68 is the direction in which the rotation of the motor 54 is restricted by the P wall 78. The detent plate 60 is rotated against the spring force of the spring 68 even after the contact between the P wall 78 and the roller 70. As a result, the spring 68 is deflected so that the spring force of the spring 68 increases, and a push-back force of the P rod 62 also increases. When the rotational force of the motor 54 balances with a sum of the spring force of the spring 68 and the push-back force of the P rod 62, the rotation of the detent plate 60 stops. For example, when a minimum or maximum value of the encoder count Cenc does not change for a predetermined time, the shift-switching control portion 92 determines that the rotation of the detent plate 60 and the motor 54 is stopped.

The shift-switching control portion 92 detects, as a provisional P-wall position, the position of the detent plate 60 at the time of stop of the rotation, and calculates a deflection amount or a deflection angle of the spring 68 at the time of stop of the rotation. The shift-switching control portion 92 calculates the deflection amount or the deflection angle by applying a voltage applied to the motor 54 to a predefined map representative of a relationship between the voltage applied to the motor 54 and the deflection amount or the deflection angle, for example. Based on the deflection amount or the deflection angle of the spring 68 at the time of stop of the rotation and a predetermined position correction map, the shift-switching control portion 92 corrects the provisional P-wall position and determines the corrected position as the P-wall position. Subsequently, the shift-switching control portion 92 drives the motor 54 to rotate the detent plate 60 by a predetermined amount in a direction causing the P wall 78 to move away from the roller 70, and determines, as a predetermined P position, the position of the detent plate 60 rotated by the predetermined amount. The predetermined P position is a predetermined position set in advance in the P position range and is the P target rotation position, for example. The shift-switching control portion 92 detects the non-P-wall position in the same way as the detection of the P-wall position. In the detection of the non-P-wall position, the deflection amount or the deflection angle of the spring 68 at the time of stop of the rotation is replaced with an extension amount of the spring 68.

The shift-switching control portion 92 may set the detected P-wall position as the reference position of the motor 54 or may set the detected non-P-wall position as the reference position of the motor 54. Alternatively, the shift-switching control portion 92 may set the detected P-wall position as a first reference position of the motor 54 corresponding to the P position of the automatic transmission 18, and may set the detected non-P-wall position as a second reference position of the motor 54 corresponding to the non-P position of the automatic transmission 18. In this example, the first reference position is referred to as a P reference position, and the second reference position is referred to as a non-P reference position.

As described above, when the vehicle electric-power source is switched from the OFF state to the IG-ON state by the driver's operation, i.e., by the vehicle electric-power source operation, the shift-switching control portion 92 performs, as an initial operation of the motor 54, an initial position learning process for setting the reference position of the motor 54, which serves as a basis for controlling the motor 54. The shift-switching control portion 92 performs the initial position learning process by setting the reference position of the motor 54 based on the encoder count Cenc when the motor 54 is rotated in a direction in which the rotation of the motor 54 is restricted. In this example, the initial position learning process for setting the P reference position of the motor 54 is referred to as a P-position learning process that is a first initial position learning process, and the initial position learning process for setting the non-P reference position of the motor 54 is referred to as a non-P-position learning process that is a second initial position learning process.

After setting the reference position of the motor 54, the shift-switching control portion 92 switches the shift position of the automatic transmission 18 based on the P-switch operation or the non-P lever operation by the driver, for example. Specifically, when the shift position is the non-P position and the P-switch operation is performed, i.e., the input of the P-switch signal Spsw is detected, the shift-switching control portion 92 outputs, to the motor 54, the P-switching control command signal Splock for switching the shift position to the P position. When the shift position is the P position and the non-P lever operation is performed, i.e., the input of the lever position signal Splev is detected, the shift-switching control portion 92 outputs, to the motor 54, the P-switching control command signal Splock for switching the shift position to the non-P position. Additionally, the shift-switching control portion 92 switches the shift position to one of the R, N, and D positions which corresponds to the lever position signal Splev.

An ECU power source serving as a power source in the electronic control device 90 may be momentarily interrupted. The ECU power source is a control-device electric-power source supplied with an electric power from the vehicle electric-power source. The momentary interruption of the ECU power source is a phenomenon in which the ECU power source is temporarily brought into the off state and then returned to the on state, i.e., a phenomenon in which the ECU power source is placed in the off state for an extremely short time. The momentary interruption of the ECU power source may be caused by occurrence of momentary interruption of the vehicle electric-power source or may be caused solely in the ECU power source for some reason without occurrence of the momentary interruption of the vehicle electric-power source. In any case, the momentary interruption of the ECU power source considered as a problem in this example is not caused by the vehicle electric-power source operation performed by the driver. Where the electronic control device 90 is constituted by two or more control units exclusively assigned to perform respective different controls such as the output control, the shift control, the SBW control, the momentary interruption of the ECU power source considered as a problem in this example may be caused at least as momentary interruption of the SBW-ECU power source that is the power source in the control unit for the SBW control. For example, the control unit for the SBW control is an SBW-ECU including the shift-switching control portion 92.

If the momentary interruption of the ECU power source as described above has occurred, the absolute position of the motor 54 may become indefinite, and therefore, it is desirable that the initial position learning process is performed by the shift-switching control portion 92. However, if the momentary interruption of the ECU power source has occurred, the shift position of the automatic transmission 18 is probably set to the shift position intended by the driver, unlike the case that the vehicle electric-power source is turned on by the driver's vehicle electric-power source operation. Therefore, if the initial position learning process is uniformly performed when the momentary interruption of the ECU power source has occurred, the shift position of the automatic transmission 18 may be switched to a shift position unintended by the driver. It is desired that the switching to a shift position unintended by the driver is avoided when the momentary interruption of the ECU power source has occurred. A control actuation for avoiding the switching to a shift position unintended by the driver will hereinafter be described.

The shift-switching control portion 92 determines whether the momentary interruption of the ECU power source has occurred. In other words, the shift-switching control portion 92 determines whether the ECU power source is reset due to the momentary interruption. For example, the resetting of the ECU power source means that the ECU power source in the on state is temporarily brought into the off state and then returned to the on state. For example, the shift-switching control portion 92 determines whether the momentary interruption of the ECU power source has occurred based on whether the ECU power source is switched to the ON state after the ECU power source is switched from the ON state to the OFF state without the vehicle electric-power source operation by the driver. If the ECU power source is switched from the on state to the off state without the vehicle electric-power source operation by the driver, this is a state in which a system related to the SBW control is not normally terminated, for example. Therefore, the shift-switching control portion 92 may determine whether the momentary interruption of the ECU power source has occurred based on whether the ECU power source is reset while the system related to the SBW control is not normally terminated, for example.

If it is determined that the momentary interruption of the ECU power source has occurred, the shift-switching control portion 92 does not perform the initial position learning process until the shift switching operation is performed by the driver. Specifically, when it is determined that the momentary interruption of the ECU power source has occurred and that the P-switch operation is performed by the driver, the shift-switching control portion 92 performs the P-position learning process. On the other hand, when it is determined that the momentary interruption of the ECU power source has occurred and that the non-P lever operation is performed by the driver, the shift-switching control portion 92 performs the non-P-position learning process.

When it is attempted to switch the shift position of the automatic transmission 18 to the P position during running of the vehicle 10, a phenomenon called "P ratcheting" occurs. The P ratcheting is a phenomenon in which attempts are repeatedly made to cause the output gear 20 to be non-rotatably mechanically fixed, i.e., a phenomenon in which attempts are repeatedly made to cause the claw portion of the P-pawl pawl 66 to mesh with the gear teeth of the P-lock gear 64. Such P ratcheting is desirably prevented. When the P-switch operation is performed by the driver during running of the vehicle 10, the shift-switching control portion 92 rejects the P-switch operation. Therefore, during running of the vehicle 10, only the non-P lever operation is considered as a valid shift switching operation between the P-switch operation and the non-P lever operation. When the vehicle is running at the time of determination of occurrence of the momentary interruption of the ECU power source, the shift-switching control portion 92 disables the P-position learning process and enables only the non-P-position learning process. In other words, upon the occurrence of the momentary interruption of the ECU power source during running of the vehicle 10, the shift-switching control portion 92 is configured to perform the non-P-position learning process when the driver performs the non-P lever operation, and is configured to not perform the P-position learning process even when the driver performs the P-switch operation.

When determining that the momentary interruption of the ECU power source has occurred, the shift-switching control portion 92 determines whether the vehicle 10 is running. The shift-switching control portion 92 determines whether the vehicle 10 is running based on whether the vehicle speed V is present, i.e., whether the vehicle speed V exceeds a stop determination vehicle speed. For example, the stop determination vehicle speed is a predefined upper limit of the vehicle speed V for preventing the P ratcheting when the shift position of the automatic transmission 18 is switched to the P position.

When determining that the vehicle 10 is not running at the time of determination of occurrence of the momentary interruption of the ECU power source, the shift-switching control portion 92 determines whether the P-switch operation is performed by the driver. When determining that the P-switch operation is not performed by the driver, the shift-switching control portion 92 determines whether the non-P lever operation is performed by the driver. On the other hand, when determining that the vehicle 10 is running at the time of determination of occurrence of the momentary interruption of the ECU power source, the shift-switching control portion 92 determines whether the non-P lever operation is performed by the driver. Since the P-switch operation is rejected during running of the vehicle 10, the shift-switching control portion 92 does not need to determine whether the P-switch operation is performed by the driver if the vehicle 10 is running at the time of determination of occurrence of the momentary interruption of the ECU power source.

When the initial position learning process is to be performed after waiting until the shift switching operation is performed by the driver at the time of occurrence of the momentary interruption of the ECU power source, it is preferable that the shift position of the automatic transmission 18 is set to the N position and held in the N position until the initial position learning process is performed. Therefore, if determining that the momentary interruption of the ECU power source has occurred, the shift-switching control portion 92 sets the shift position of the automatic transmission 18 to the N position until the shift switching operation is performed by the driver.

Figure 5:
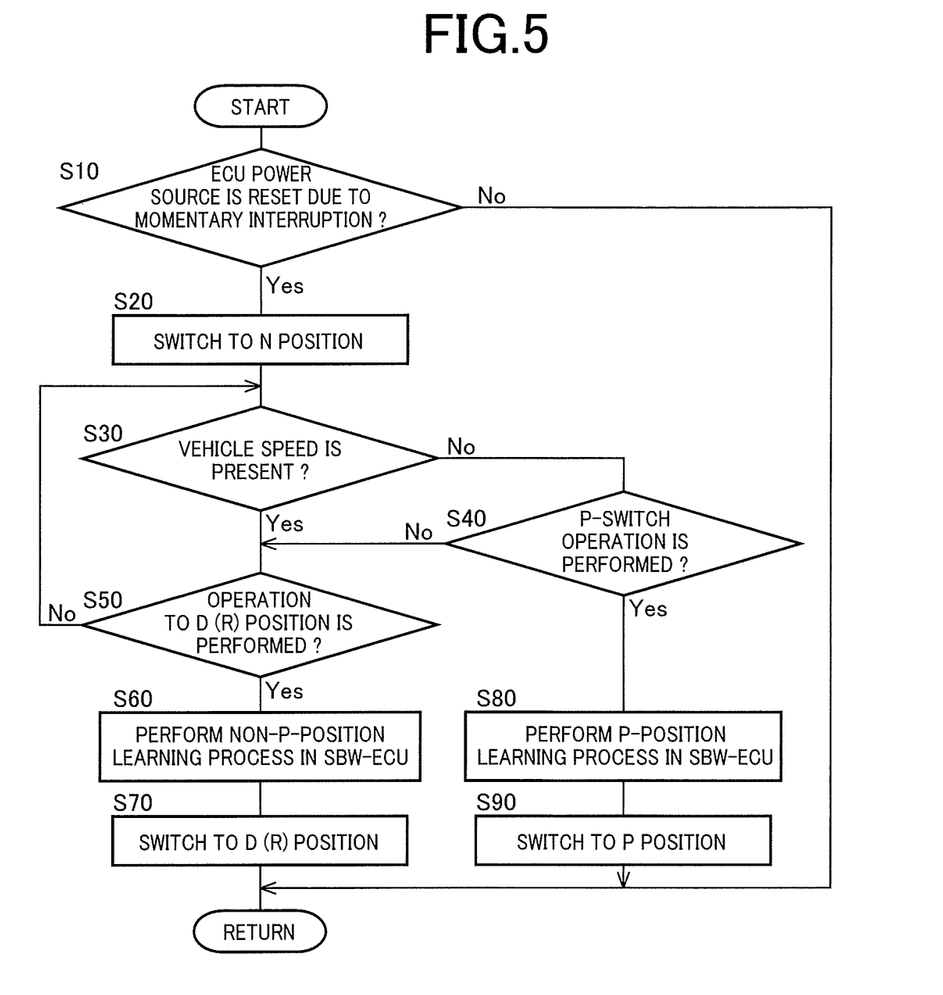
FIG. 5 is a flowchart for explaining a main portion of control actuation of an electronic control device, i.e., control actuation for avoiding switching to the shift position unintended by a driver of the vehicle at the time of occurrence of a momentary interruption of an ECU power source.
Figure 6:
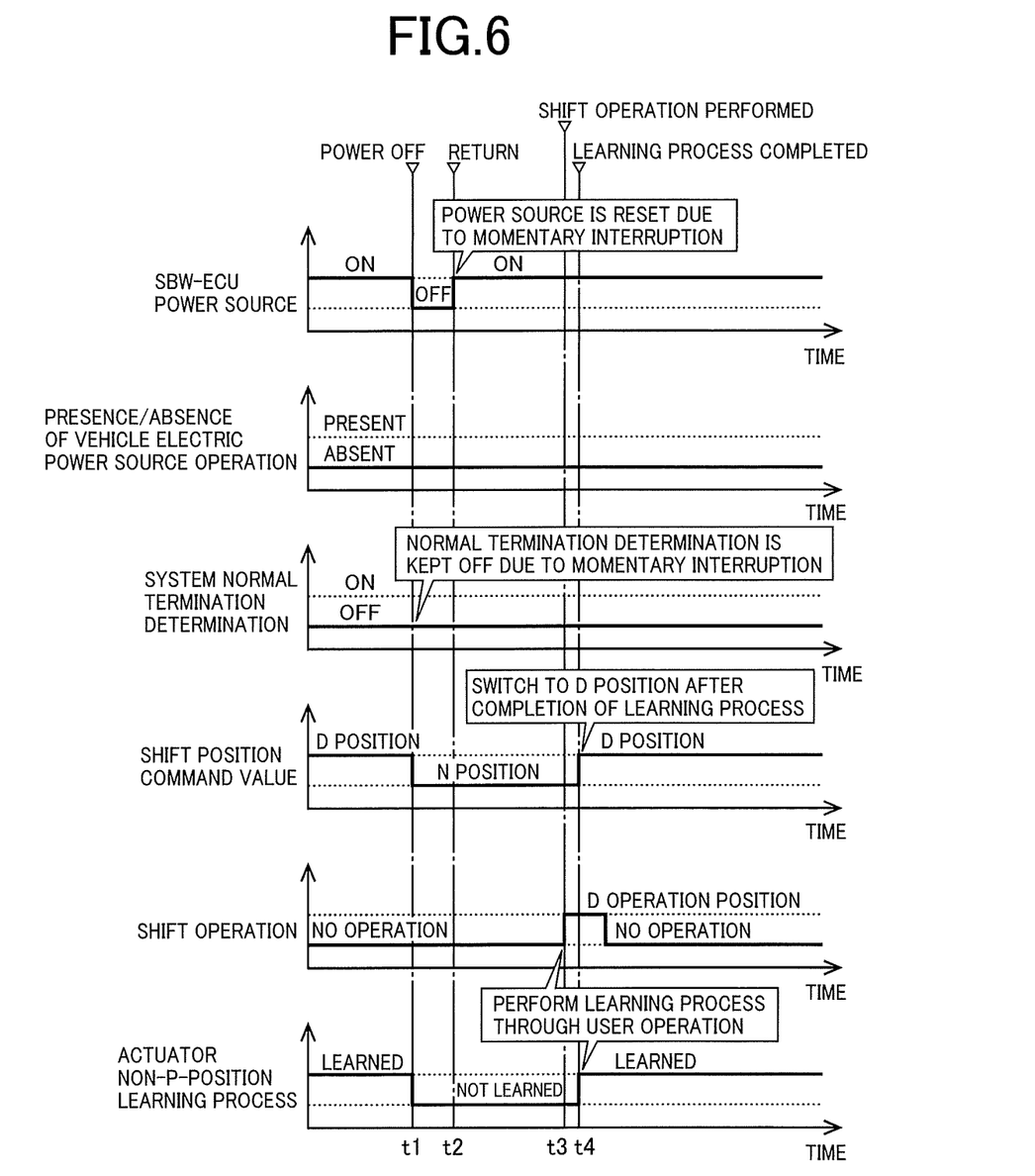
FIG. 6 is a diagram showing an example of a time chart when the control actuation shown in the flowchart of FIG. 5 is performed.

FIG. 5 is a flowchart for explaining a main portion of control actuation of the electronic control device 90, i.e., control actuation for avoiding the switching to a shift position unintended by the driver at the time of occurrence of the momentary interruption of the ECU power source, and is repeatedly executed. Steps in the flowchart of FIG. 5 correspond to the function of the shift-switching control portion 92. FIG. 6 is a diagram showing an example of a time chart when the control actuation shown in the flowchart of FIG. 5 is performed.

In FIG. 5, first, a step (hereinafter, step is omitted) S10, it is determined whether the ECU power source is reset due to the momentary interruption. If the determination of S10 is negative, this routine is terminated. If the determination of S10 is affirmative, the shift position of the automatic transmission 18 is switched to the N position at S20. Subsequently, at S30, it is determined whether the vehicle speed V is present. If the determination of S30 is negative, it is determined at S40 whether the P-switch operation is performed by the driver. If the determination of S30 is affirmative, or if the determination of S40 is negative, it is determined at S50 whether the non-P lever operation is performed by the driver. Particularly, it is determined whether the non-P lever operation to the D-operation position or to the R-operation position is performed by the driver. If the determination of S50 is negative, S30 is executed. If the determination of S50 is affirmative, the non-P-position learning process is performed at S60. Subsequently, at S70, the shift position of the automatic transmission 18 is switched to the non-P position. Particularly, the shift position of the automatic transmission 18 is switched to the D position or to the R position corresponding to the non-P lever operation. On the other hand, if the determination of S40 is affirmative, the P-position learning process is performed at S80. Subsequently, at S90, the shift position of the automatic transmission 18 is switched to the P position.

FIG. 6 shows an example of an embodiment when the ECU power source is reset due to the momentary interruption during running of the vehicle 10. In FIG. 6, since the ECU power source is reset without the vehicle electric-power source operation by the driver, it is determined that the system related to the SBW control is not normally terminated. In other words, the momentary interruption of the SBW-ECU power source has occurred between time t1 and time t2. When the momentary interruption of the SBW-ECU power source has occurred, the initial position learning process is not performed until the shift switching operation is performed by the driver. When the non-P lever operation to the D-operation position is performed by the driver, the non-P-position learning process is started (see time t3). When the non-P-position learning process is completed, a command for switching the shift position of the automatic transmission 18 to the D position is output (see time t4). A command for setting the shift position of the automatic transmission 18 to the N position is output until the non-P-position learning process is performed (see time t1 to time t4).

As described above, according to this example, when the momentary interruption of the ECU power source has occurred, the initial position learning process of the motor 54 is not performed until the shift switching operation is performed by the driver, so that it is possible to maintain the position of the motor 54 at the time of occurrence of the momentary interruption of the ECU power source. Therefore, when the momentary interruption of the ECU power source has occurred, the switching to a shift position unintended by the driver can be avoided.

According to this example, when the momentary interruption of the ECU power source has occurred and the P-switch operation is performed by the driver, the P-position learning process is performed, so that the shift position can be switched to the parking position intended by the driver. On the other hand, when the momentary interruption of the ECU power source has occurred and the non-P lever operation is performed by the driver, the non-P-position learning process is performed, so that the shift position can be switched to the non-parking position intended by the driver. This eliminates the need for storing the shift position of the automatic transmission 18 in preparation for the momentary interruption of the ECU power source before the momentary interruption of the ECU power source. Therefore, a storage area is no longer necessary for storing the shift position in the electronic control device 90 etc., so that the cost of the electronic control device 90 etc. can be reduced, and the restriction on the storage area can be relaxed.

According to this example, when the vehicle is running at the time of occurrence of the momentary interruption of the ECU power source, the P-position learning process is disabled, and only the non-P-position learning process is enabled, so that the P ratcheting can be prevented.

According to this example, when the momentary interruption of the ECU power source has occurred, the shift position of the automatic transmission 18 is set to the N position and held in the N position until the shift switching operation is performed by the driver, so that power transmission can be interrupted during waiting until the shift position intended by the driver is known.

Another example of the present invention will be described. In the following description, the portions common to the examples are denoted by the same reference numerals and will not be described.

EXAMPLE 2

During stop of the vehicle, the P ratcheting due to switching to the P position during running does not occur. Therefore, the shift-switching control portion 92 may be configured to not perform the initial position learning process of the motor 54 until the shift switching operation is performed by the driver only when the momentary interruption of the ECU power source has occurred during running.

Figure 7:
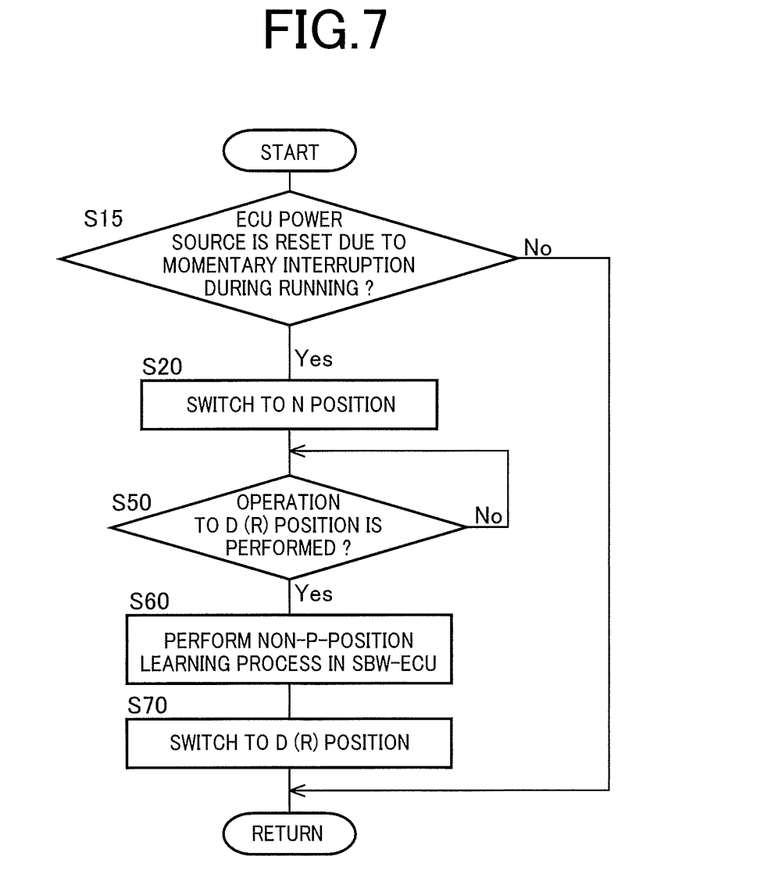
FIG. 7 is a flowchart for explaining a main portion of control actuation of the electronic control device, i.e., control actuation for avoiding the switching to the shift position unintended by the driver at the time of occurrence of the momentary interruption of the ECU power source, in an example that is different from an example shown in FIG. 5.

FIG. 7 is a flowchart for explaining a main portion of control actuation of the electronic control device 90, i.e., control actuation for avoiding the switching to a shift position unintended by the driver at the time of occurrence of the momentary interruption of the ECU power source, and is repeatedly executed. The flowchart of FIG. 7 is an example different from the flowchart of FIG. 5. Steps in the flowchart of FIG. 7 correspond to the function of the shift-switching control portion 92.

In FIG. 7, first, at S15, it is determined whether the ECU power source is reset due to the momentary interruption during running of the vehicle 10. If the determination of S15 is negative, this routine is terminated. If the determination of S15 is affirmative, the shift position of the automatic transmission 18 is switched to the N position at S20. Subsequently, it is determined at S50 whether the non-P lever operation to the D-operation position or the R-operation position is performed by the driver. If the determination of S50 is negative, S50 is repeatedly executed. If the determination of S50 is affirmative, the non-P-position learning process is performed at S60. Subsequently, at S70, the shift position of the automatic transmission 18 is switched to the D position or the R position corresponding to the non-P lever operation.

As described above, according to this example, the P ratcheting due to switching to the P position during running can be prevented. Additionally, when the momentary interruption of the ECU power source has occurred, the switching to the shift position, or particularly, the D position or the R position, unintended by the driver can be avoided.

Although the examples of the present invention have been described in detail with reference to the drawings, the present invention is also applicable in other forms.

For example, in the examples, the shift operation device 30 includes the two operation elements, i.e., the shift lever 32 and the P switch 34; however, the present invention is not limited to this form. For example, the shift operation device 30 may be a shift operation device which is to be placed in each of operation positions such as P, R, N, and D corresponding to the shift positions of the automatic transmission 18, and which includes one operation element such as a lever or a dial operated to the operation positions, and a position sensor for electrically detecting that the operation element is operated to each of the operation positions.

In the examples, the switching device 50 is configured to switch the shift position of the automatic transmission 18 between the P position and the non-P position; however, the present invention is not limited to this form. For example, the switching device 50 may be a switching device configured to switch the shift position of the automatic transmission 18 to each of positions such as P, R, N, and D positions.

In the examples, the power transmission device 16 includes the automatic transmission 18 and is configured to transmit the power of the drive power source 12 to the drive wheels 14; however, the present invention is not limited to this form. For example, the power transmission device may not include an automatic transmission. Specifically, the vehicle 10 may be a vehicle without the automatic transmission 18, for example, a series hybrid vehicle without an automatic transmission, or may be an electric vehicle etc. capable of driving a driving rotating machine with an electric power of a battery to perform motor running. In the power transmission device without an automatic transmission, for example, the shift position is switched between the P position and the non-P position by a switching device as in the automatic transmission 18. In short, the present invention is applicable to any vehicle including a power transmission device configured to transmit a power of a drive power source to drive wheels of the vehicle, and a switching device configured to switch a shift position of the power transmission device through actuation of an actuator based on a control command signal corresponding to an operation position in a shift operation device.

The above description is merely an embodiment and the present invention can be implemented in variously modified and improved forms based on the knowledge of those skilled in the art.

What is claimed is:

1. A control device for a vehicle including (i) a power transmission device configured to transmit a power of a drive power source to drive wheels of the vehicle, (ii) a shift operation device that is to be operated by a driver of the vehicle to an operation position corresponding to a shift position of the power transmission device, and (iii) a switching device configured to switch the shift position of the power transmission device through actuation of an actuator based on a control command signal corresponding to the operation position, the control device comprising:
a shift-switching control portion configured, when a vehicle electric-power source is switched from an off state to an on state by an operation of the driver, to perform, as an initial operation of the actuator, an initial position learning process for setting a reference position of the actuator, which serves as a basis for controlling the actuator, wherein upon occurrence of a momentary interruption of a control-device electric-power source that is supplied with an electric power from the vehicle electric-power source, the shift-switching control portion is configured to not perform the initial position learning process, until a shift switching operation for switching the shift position of the power transmission device is performed by the driver.

2. The control device of according to claim 1, wherein
the power transmission device includes a rotating member that is to be rotated together with the drive wheels,
upon the occurrence of the momentary interruption of the control-device electric-power source, the shift-switching control portion is configured to perform a first initial position learning process for setting a first reference position of the actuator corresponding to a parking position in which the rotating member is non-rotatably mechanically fixed, when the driver performs a first shift switching operation for switching the shift position of the power transmission device to the parking position, and
upon the occurrence of the momentary interruption of the control-device electric-power source, the shift-switching control portion is configured to perform a second initial position learning process for setting a second reference position of the actuator corresponding to a non-parking position in which the rotating member is released from being mechanically fixed, when the driver performs a second shift switching operation for switching the shift position of the power transmission device to the non-parking position.

3. The control device according to claim 2, wherein, upon the occurrence of the momentary interruption of the control-device electric-power source during running of the vehicle, the shift-switching control portion is configured to perform the second initial position learning process when the driver performs the second shift switching operation, and is configured to not perform the first initial position learning process even when the driver performs the first shift switching operation.

4. The control device according to claim 1, wherein, upon the occurrence of the momentary interruption of the control-device electric-power source, the shift-switching control portion is configured to set the shift position of the power transmission device to a neutral position in which transmission of the power is interrupted in the power transmission device, until the shift switching operation is performed by the driver.

5. The control device of a vehicle according to claim 1, wherein
the shift-switching control portion is configured to acquire a count value corresponding to a movement amount of the actuator, and to control the actuator such that the count value matches a predefined target count value, and wherein the shift-switching control portion is configured to perform the initial position learning process by setting the reference position based on the count value when the actuator is moved in a direction in which the movement of the actuator is restricted.

* * * * *